United States Patent
McCasky et al.

(10) Patent No.: US 7,520,116 B2
(45) Date of Patent: Apr. 21, 2009

(54) COLLAPSING ON-BOARD CROP RECEIVER AND DUCT OF A COTTON HARVESTER

(75) Inventors: William J. McCasky, Hopewell, IL (US); Kevin S. Richman, Lititz, PA (US); Timothy A. Meeks, Davenport, IA (US); Kenneth W. Brown, Port Byron, IL (US); Frank C. Dupire, Manheim, PA (US); Earl R. Snyder, Lititz, PA (US); Peter Z. Tan, Castro Valley, CA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/880,133

(22) Filed: Jul. 20, 2007

(65) Prior Publication Data

US 2009/0019829 A1 Jan. 22, 2009

(51) Int. Cl.
*A01D 46/08* (2006.01)

(52) U.S. Cl. .......................................... 56/30

(58) Field of Classification Search ..................... 56/30, 56/32, 344, 60, 28; 460/114, 115, 119; 414/495; 100/226, 255, 35
See application file for complete search history.

(56) References Cited

U.S. PATENT DOCUMENTS

| | | | |
|---|---|---|---|
| 3,842,730 A | 10/1974 | White et al. | 100/245 |
| 3,847,072 A | 11/1974 | Garrison | 100/35 |
| 3,886,718 A | 6/1975 | Garrison et al. | 56/344 |
| 3,901,142 A | 8/1975 | Wood | 100/255 |
| 3,973,377 A | 8/1976 | Lundahl | 56/1 |
| 4,519,189 A | 5/1985 | Fachini et al. | 56/16.6 |
| 4,930,297 A | 6/1990 | Schlueter et al. | 56/16.6 |
| 4,996,831 A | 3/1991 | Pearson et al. | 56/16.6 |
| 5,042,237 A * | 8/1991 | Sanderson | 56/10.2 R |
| 5,088,274 A * | 2/1992 | Garter et al. | 56/30 |
| 5,407,390 A | 4/1995 | Carney et al. | 460/119 |
| 5,609,523 A | 3/1997 | Ringwald et al. | 460/119 |
| 5,857,908 A * | 1/1999 | Snyder et al. | 460/115 |
| 6,263,650 B1 | 7/2001 | Duetsch et al. | 56/16.4 B |
| 6,409,456 B1 | 6/2002 | Horejsi et al. | 414/495 |
| 6,701,701 B2 | 3/2004 | Wigdahl et al. | 56/28 |
| 6,928,797 B1* | 8/2005 | Brantley | 56/12.9 |
| 7,178,454 B2 | 2/2007 | Covington et al. | 100/226 |
| 2005/0039429 A1* | 2/2005 | Haverdink | 56/30 |
| 2005/0086922 A1* | 4/2005 | Bares et al. | 56/30 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

Apparatus for collapsing an on-board crop receiver of a harvester to a transport position, utilizing a remotely releasable locking element to allow telescopic collapsing or retracting the receiver without entering the receiver, and powered apparatus for positively collapsing a duct extending between a row unit of the harvester and an inlet opening of the receiver. The duct is telescopically retractable at an inclined angle by a similarly inclined duct driver to a height about equal to that of the receiver when in the transport position, so as to be freed from the receiver and any associated hood extending outwardly therefrom associated with the inlet opening. Using crop compactor apparatus within the interior of the receiver, the compactor can be lowered and the locking mechanism unlocked, and then the compactor operated to telescopically collapse or retract the receiver. The receiver can be extended in the reverse order.

20 Claims, 13 Drawing Sheets

COLLAPSING ON-BOARD CROP RECEIVER AND DUCT OF A COTTON HARVESTER

TECHNICAL FIELD

This invention relates generally to apparatus and a method for collapsing or retracting an on-board crop receiver of a harvester for transport and storage, which, more particularly, utilizes a remotely releasable locking element to allow telescopic collapsing or retracting the receiver, and powered apparatus for positively collapsing a duct extending between a row unit of the harvester and an inlet opening of the receiver.

BACKGROUND ART

Crop harvesters such as for cotton, typically include a plurality of row units for harvesting or stripping crop from plants, which row units are arrayed across a front end of the harvester. Such harvesters include ducts extending individually or in pairs upwardly and rearwardly from the row units to an inlet opening or openings through the upper front region of a crop receiver structure. The receiver is generally in the form of a basket, and typically includes a compactor apparatus operable for compacting cotton received and contained therein.

More advanced cotton receivers are configured as cotton module builders, and include compactor apparatus operable for building a densely compacted, freestanding module from the cotton. Reference in this latter regard, Covington et al., U.S. Pat. No. 7,178,454 issued Feb. 20, 2007, and entitled Compactor Apparatus Including Single Cylinders and Guide Members on the Sides of an On-board Module Builder of a Cotton Harvesting Machine. The overall operational height of such harvesting machines typically exceed height limits for vehicles for travel over public roads and thoroughfares. As a result, many cotton receiver structures, as exemplified by the module builder of the Covington et al. patent, are designed to be collapsible or retractable to a shorter height. To illustrate, the module builder of the Covington et al. patent is collapsible to a sufficient extent so as to have an overall collapsed height which is at or below the height limit for road travel, and is about the height of the roof of the operator cabin of that harvester.

Typically, when a cotton receiver is filled to its capacity with cotton, or at other times, the receiver can be unloaded. Some cotton receivers are raised in their entirety for unloading. For others, such as the module builder of the above-referenced Covington et al. patent, only the front end of the receiver is raised, so as to tilt the receiver for unloading. In still other constructions, the receiver is tilted to one side or the other, as illustrated in Wigdahl et al., U.S. Pat. No. 6,701,701, entitled Duct Support and Transition Structure for a Harvester, issued Mar. 9, 2004. In each instance, the front end of the receiver is required to be moved away from the cotton ducts, which typically remain in their operational positions. To accommodate this, the referenced Covington et al. patent utilizes a well known construction wherein the upper ends of the ducts terminate in curved, rearwardly open end portions aligned with forwardly facing openings on the upper front end of the receiver. The forwardly facing openings may, or may not, include associated hood structures extending thereabove. An observed advantage of this construction is that it allows the receiver to freely move away from and toward the ends of the ducts. In the harvester of the Wigdahl et al. patent, the upper ends of the ducts terminate with an upwardly facing opening beneath or within the interior of a larger hood extending continuously the width of the upper front end of the receiver, and the hood is moved away with the cotton receiver from the ducts during the unloading operation. As with the Covington et al. construction, an advantage is that no disconnection or disassembly of the receiver from the ducts is required for the unloading operation.

When the cotton receiver is vertically telescopically retracted or collapsed into a reduced height transport and storage mode, the ducts are also typically telescopically retracted or collapsed to a reduced height. In the referenced Covington et al. construction, the ducts are telescopically collapsible in the well known manner, and the upper ends of the ducts are located forwardly of the front end of the receiver and any associated hood structure. This enables collapsing both the cotton receiver and any associated hood structure to about the cabin height, without requiring disassembly. As another example of a known duct structure reducible in height to that of the operator cabin, reference Schneider et al U.S. Pat. No. 5,857,908 entitled Duct Structure for a Cotton Harvester, issued Jan. 12, 1999, wherein the upper portions of the respective ducts are pivotable relative to the lower portions.

In contrast, in the referenced Wigdahl et al. construction, apparatus is provided for connecting the upper ends of the ducts together for joint vertical movement between the operational and collapsed states, which apparatus includes fluid cylinder drivers for powered operation, and which vertical movement maintains the upper ends of the ducts when in the collapsed state directly beneath the larger hood. A limitation of this arrangement, however, is that in the illustrated collapsed state, the receiver structure still has an overall height well above the operator cabin. Thus it is apparent that the hood would have to be disassembled from the cotton receiver, or the ducts removed, for the receiver to be vertically collapsible to about the height of the operator cabin. This would be time consuming and costly, and reassembly would be required render the harvester operational again.

Therefore, what is sought is apparatus and a method for collapsing a cotton receiver and ducts for transport and storage, that is at least partially automatic, and reduces or eliminates need for disassembly and reassembly of any associated hood or hoods, and otherwise overcomes one or more of the problems and shortcomings of the known constructions and methods.

SUMMARY OF THE INVENTION

What is disclosed is apparatus and a method for collapsing a crop receiver and ducts of a harvester for transport and storage, that is at least partially automatic, and reduces or eliminates need for disassembly and reassembly of any associated hood or hoods, and otherwise overcomes one or more of the problems and shortcomings of the known constructions and methods.

According to a preferred aspect of the invention, the apparatus and method utilize a remotely releasable locking element to allow telescopic collapsing or retracting the receiver without requiring an operator to enter the receiver, and powered apparatus for positively collapsing a duct extending between a row unit of the harvester and an inlet opening of the receiver. The duct is telescopically retractable at an inclined angle by a similarly inclined duct driver to a height about equal to that of the receiver when in the transport position, so as to be freed from the receiver and any associated hood extending outwardly therefrom over the inlet opening. Using crop compactor apparatus within the interior of the receiver, the compactor can be lowered and the locking mechanism unlocked, and then the compactor operated to telescopically collapse or retract the receiver. The receiver can be extended in the reverse order. The invention is particularly adapted for use with harvesters for cotton, by also has utility for use on harvesters for other crops.

The crop receiver has an interior for receiving crop removed from plants by a row unit or units of the harvester, the crop receiver having an upwardly open lower receiver portion and an upper receiver portion telescopically supported on and movable relative to the lower receiver portion between a transport position telescopically retracted into the lower receiver portion, and an operational position telescopically projecting upwardly therefrom. And, the upper receiver portion includes at least one inlet opening configured for receiving crop into the interior therethrough, and more preferably, a line of openings across an upper end of the upper receiver portion.

The harvester preferably includes an air duct system including at least one telescoping duct configured for carrying a flow of air and crop, the duct being capable of telescopically extending at an inclined angle from the at least one row unit to adjacent to the at least one inlet opening of the upper receiver portion when in the operational position. The duct includes an upper duct portion telescopically movable relative to a lower duct portion between an extended position wherein a substantial portion of the upper duct portion extends telescopically from the lower duct portion and wherein an upper end portion of the upper duct portion is positioned adjacent to the inlet opening for directing the flow of air and crop thereto when the upper receiver portion is in the operational position. The upper duct portion has a retracted position wherein a substantial portion of the upper duct portion is at least substantially coextensive with the lower duct portion. For example, the upper duct portion can telescopically receive the lower duct portion, or can telescope into the lower duct portion. For a harvester which is a cotton harvester, as an example, two ducts per row unit may be used, and will have a retracted or collapsed height about equal to or shorter than that of an operator cabin of the harvester.

The invention preferably includes a duct support system including at least one duct driver supported by the frame at about the inclined angle and at least generally parallel to the duct, preferably in a plane defined by the inclined angle. The duct driver or drivers preferably each have an upper movable portion connected to the upper duct portion of at least one duct. As examples, the duct driver can include one or more fluid cylinders, linear actuators, other devices controllably operable for extending and retracting the upper movable portion of the duct or ducts. The duct driver or drivers are operable for moving the upper duct portion or portions along the inclined angle between the extended position and the retracted position. As a result, and as the upper duct portion or portions are moved toward the retracted position, the upper end portion or portions thereof will be displaced horizontally away from the receiver. This is advantageous, as the upper end portions are moved away from any hood or hoods extending outwardly from the upper receiver portion above the inlet opening or openings, thereby providing clearance adjacent to the receiver for allowing the hood or hoods, to be lowered to a desired retracted position or level next to the retracted ducts, such as about the height of an operator cab of the harvester, which will be a height sufficiently low for road travel.

The above capabilities, that is, the ability to remotely unlock and lock the receiver in the operational position; to move the upper receiver portion between the operational and transport positions; and to compact the air duct system to allow the collapsing of the receiver and any attached hoods to a lower height, enables easily and conveniently configuring the harvester for harvesting operation, and for travel and storage.

DETAILED DESCRIPTION OF THE INVENTION

Figure 1:
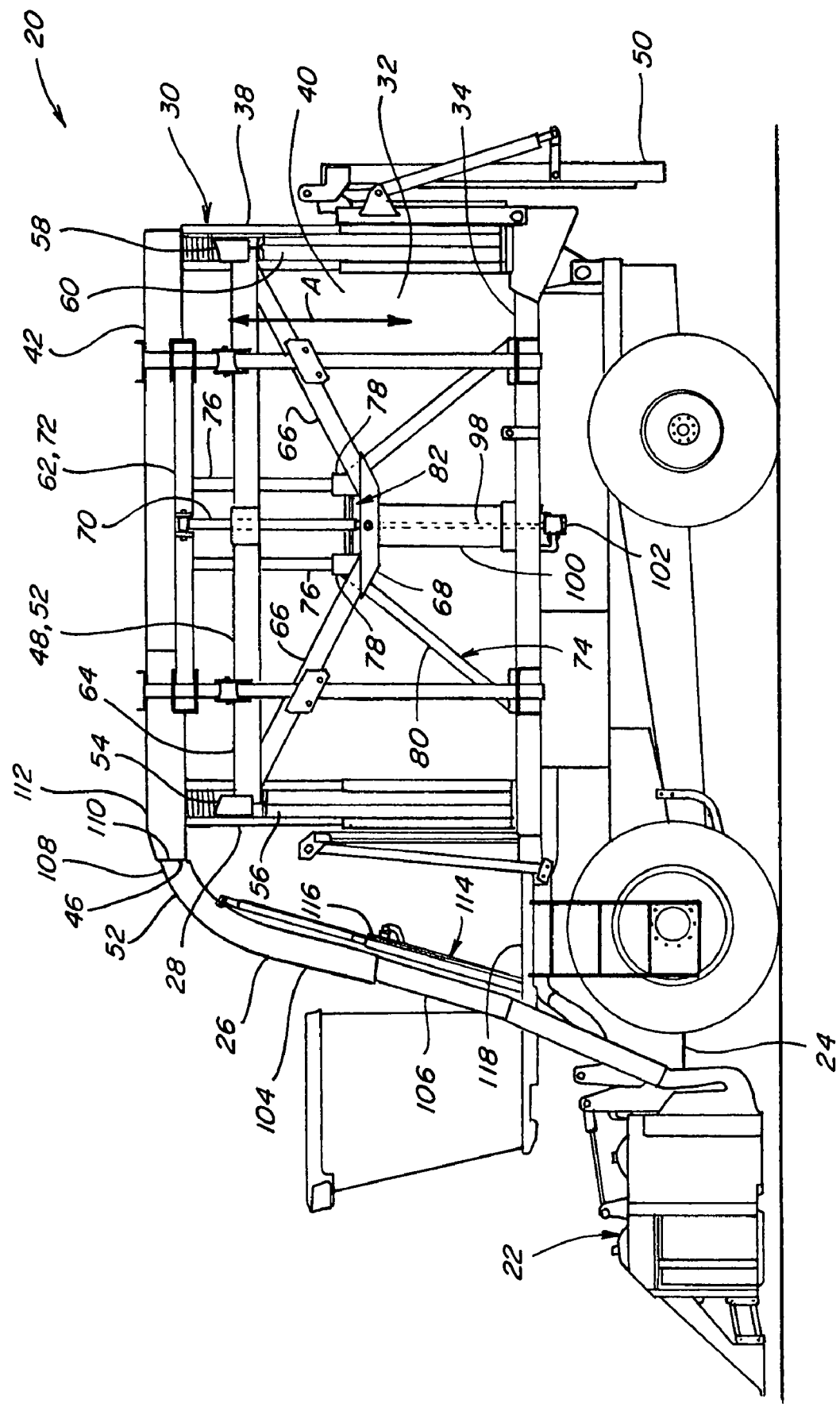
FIG. 1 is a simplified side view of a cotton harvester, showing one embodiment of a cotton receiver and cotton conveying ducts of the machine in operational positions, and apparatus for collapsing the crop receiver and ducts to transport and storage positions thereof according to the invention.
Figure 2:
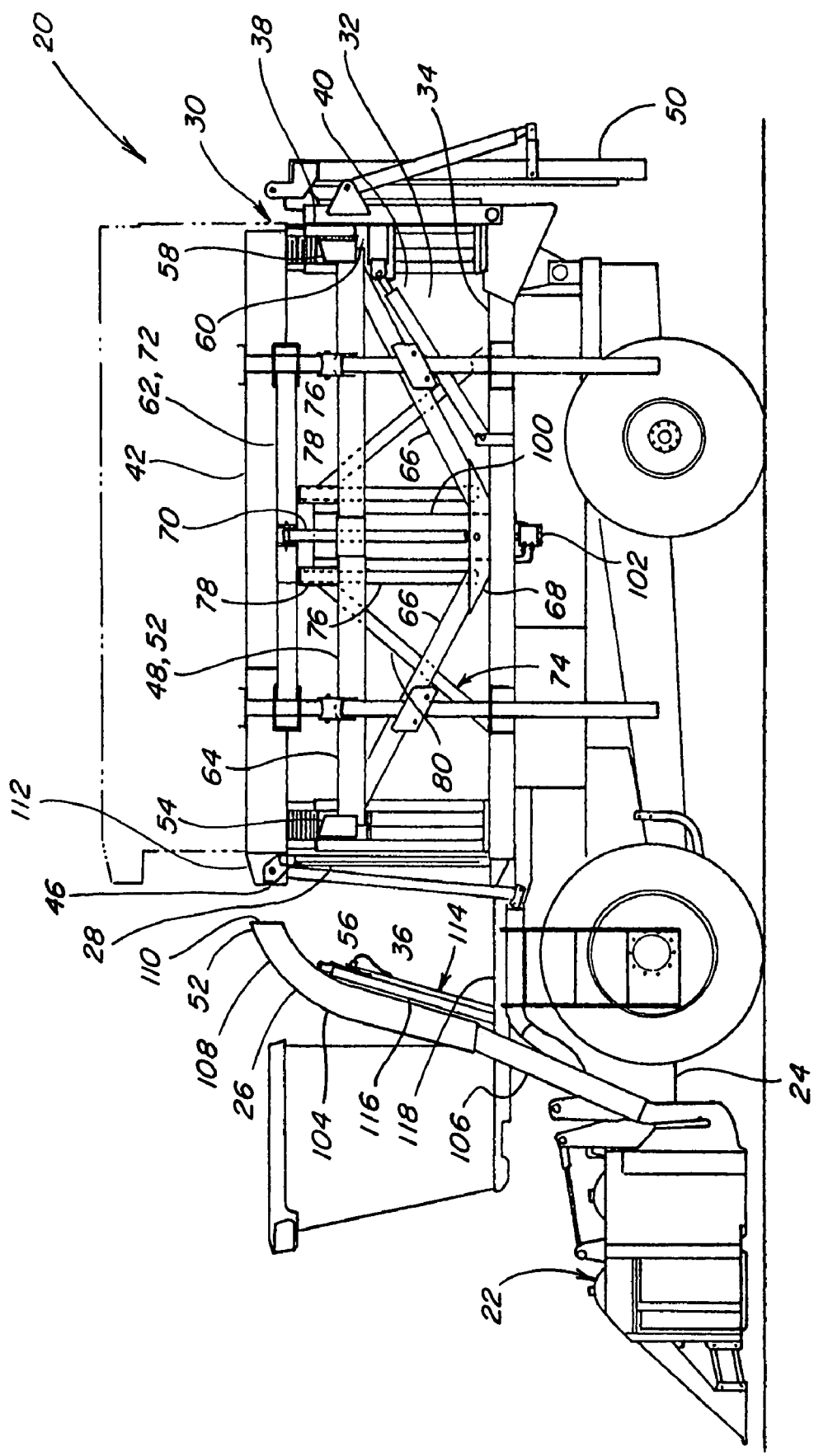
FIG. 2 is another simplified side view of the harvester, showing the receiver and ducts collapsed to a transport and storage position according to the invention.

Referring now to the drawings, in FIGS. 1 and 2, a cotton harvester 20 is shown, including a plurality of harvesting row units 24 arranged in a side-by-side array across a forward end 24 of machine 20 for harvesting cotton from plants as machine 20 is moved in the forward direction along rows of the plants (not shown). The harvested cotton is conveyed by air flows individually through a side-by-side array of ducts 26 oriented at an inclined angle so as to extend upwardly and rearwardly from units 22 to a forward end 28 of cotton receiver 30, as denoted by arrows A in FIG. 1. The air flows are generated by a blower or blowers located on the machine.

Figure 3:
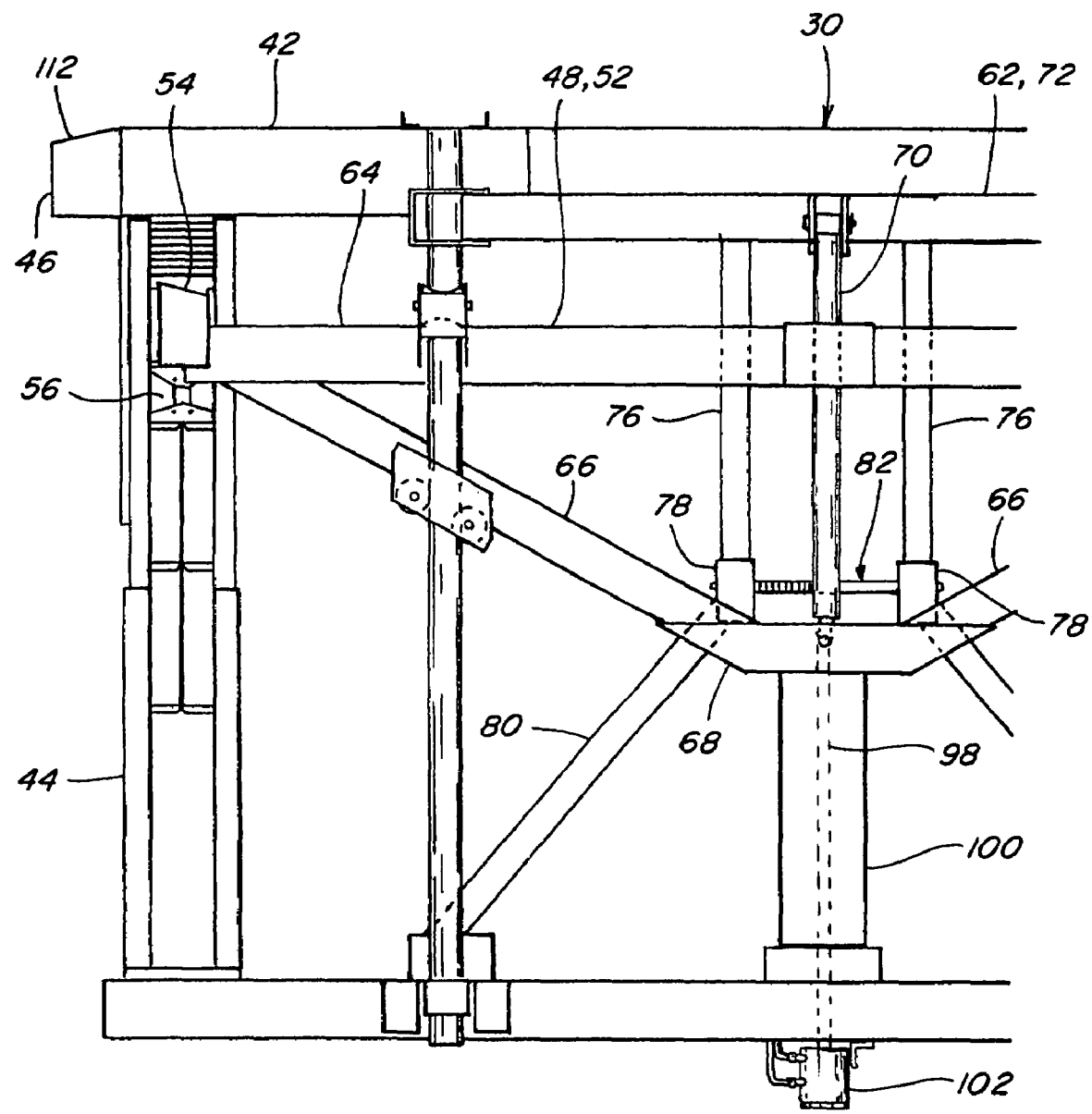
FIG. 3 is a simplified fragmentary side view of the receiver of the harvester of FIG. 1, showing aspects of the apparatus of the invention for collapsing the receiver.
Figure 4:
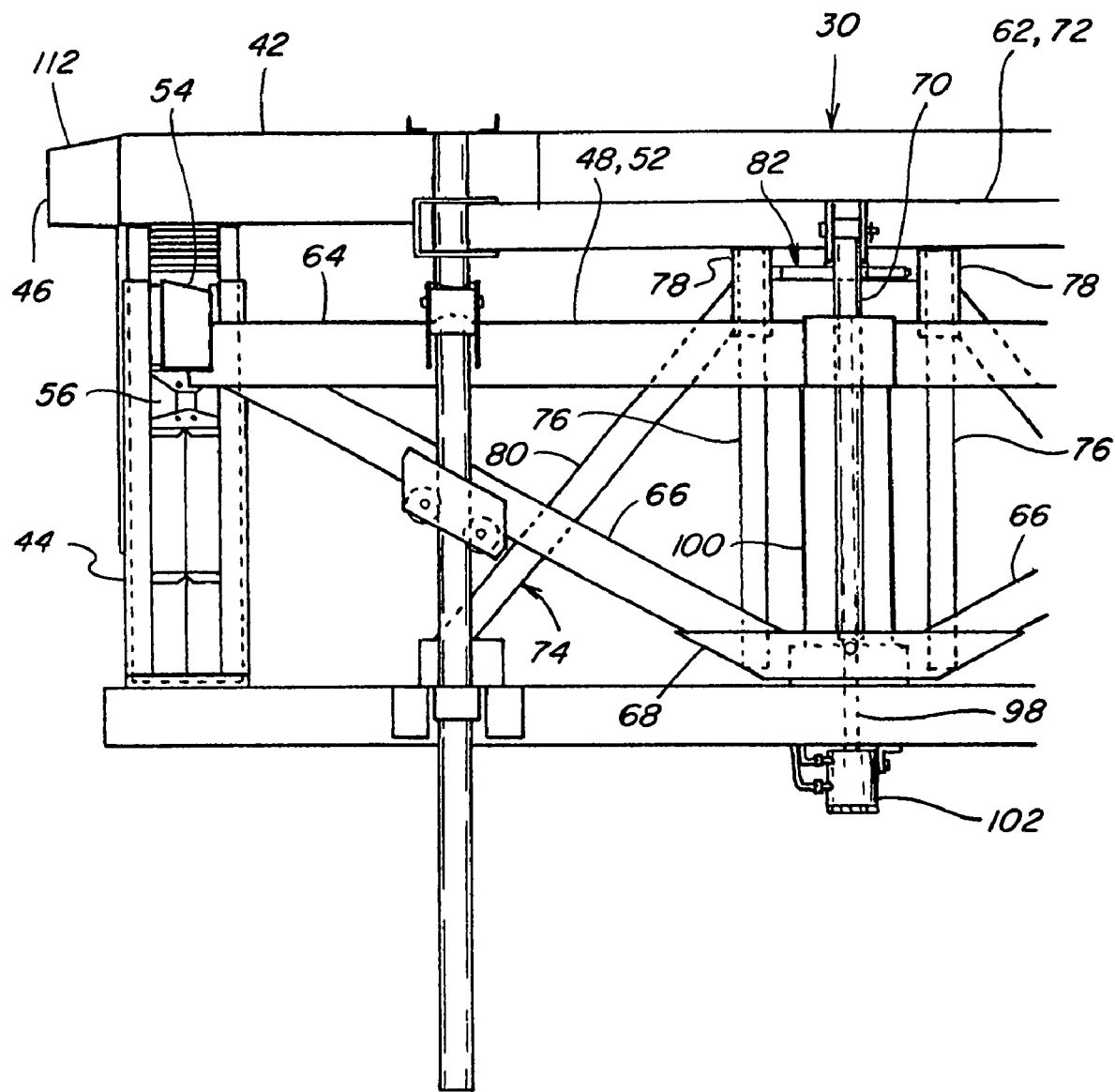
FIG. 4 is another simplified fragmentary side view of the receiver, shown in its collapsed travel position.

Referring also to FIGS. 3 and 4, cotton receiver 30 is depicted as a modern cotton module builder, which is a structure of rectangular shape, including an interior cotton compacting chamber 32 defined by a floor 34, forward and rearward end walls 36 and 38, and opposing side walls 40. Receiver 30 is of telescopic construction, including an upper receiver portion 42 which has an operational position (FIGS. 1 and 3) telescopically extending upwardly from a lower receiver portion 44, and a travel and storage position (FIGS. 2 and 4) telescopically received at least largely within lower receiver portion 44. At least portions of forward and rearward end walls 36 and 38, and side walls 40, are preferably constructed of an air permeable material, such as a mesh or perforated sheeting having holes or openings therein adequate for dissipation of air flow therethrough, but which will retain the cotton therein, interior 32 being visible through the walls.

Cotton receiver 30 is operable for receiving cotton conveyed thereto by ducts 26, into compacting chamber 32 through at least one elongate, sidewardly extending inlet opening 46 in an upper end of forward end wall 36. The cotton received in this manner is compacted within chamber 32 by compactor apparatus 48 located therein and operable for distributing the cotton within the chamber and compacting it against floor 34 into a unitary mass or module. The compacted unitary mass or module will have dimensions approximating the longitudinal and sideward extent of the interior of the receiver. The compacted mass or module is unloadable from receiver 30 by tilting forward end 28 of receiver 30 upwardly, and conveying the module rearwardly therefrom over an unloading ramp 50 deployable from the rear end of receiver 30.

Compactor apparatus 48 within chamber 32 includes a compactor frame 52 which is generally horizontal and substantially entirely disposed within chamber 32, for movement downwardly against cotton contained therein for compacting the cotton against floor 34, as denoted by arrow A in FIG. 1. Compactor frame 52 includes a front cross member 54 disposed in chamber 32 adjacent forward end wall 36, and having opposite ends which extend through slots 56 in side walls 40. Similarly, a rear cross member 58 is disposed in chamber 32 adjacent rearward end wall 38 and has opposite ends extending through slots 60. A plurality of front and rear extending members are disposed within chamber 32 and extend between and connect front and rear cross members 54 and 58. Additionally, preferably at least one, and most preferably, several augers (not shown) are supported for rotation on front and rear cross members 54 and 58, and extend forwardly and rearwardly therebetween within chamber 32. The augers can be rotated using any suitable commercially available drivers, such as a gear drive driven by a motor such as a fluid or electric motor, or directly by fluid or electric motors, as desired, for distributing the collected cotton in chamber 32 as required or desired. In this regard, it is typically desirable to distribute the cotton-evenly with respect to the plane of floor 34, such that the resultant compacted cotton module will have a substantially uniform height along its length and width. Also, external vertical pipes or tubes are provided which extend between the roof and floor of receiver 30 in connection with guide rollers for controlling the orientation of the compactor during operation thereof.

Figure 5:
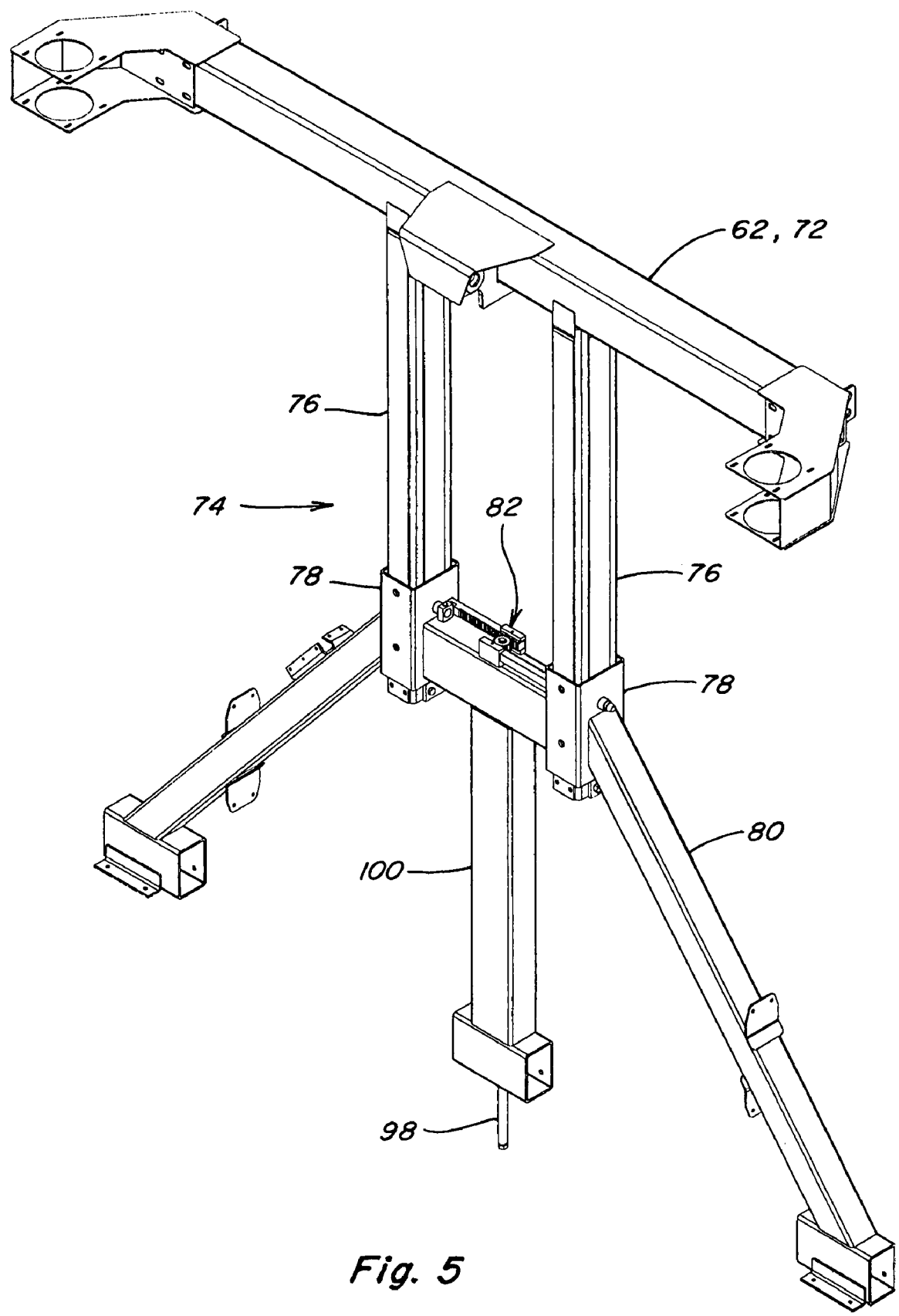
FIG. 5 is a simplified perspective view of aspects of the apparatus of the invention for collapsing the receiver.

Referring also to FIG. 5, compactor frame 52 of compactor apparatus 48 is supported in compacting chamber 32 on each side by an exterior side structure 62, each structure 62 including a substantially horizontal, forwardly and rearwardly extending main beam 64 which extends between and connects front and rear cross members 54 and 58. Each side structure 62 additionally includes a pair of braces 66 which extend downwardly and at converging angles from front and rear cross members 54 and 58, and which are connected together by a gusset 68 located spacedly below about the middle of main beam 64. Here, it should be noted that compactor frame 52 located within compacting chamber 32 and exterior side structures 62 on the exterior of the side walls 40 are movable upwardly and downwardly together.

The upward and downward movement of exterior side structures 62 and compactor frame 52, as denoted by arrow A in FIG. 1, is preferably achieved and controlled by compactor drivers 70 extending, respectively, between gusset 68 of each exterior side structure 62 and an upper side beam 72 of a collapsible side support frame 74 connected to upper receiver portion 42 of receiver 30. Compactor drivers 70 each preferably comprise a fluid cylinder which receives fluid under pressure from a suitable pressurized fluid source, such as a fluid pump (not shown) of harvester 20, for moving exterior side structure 62, and thus compactor frame 52 of compactor apparatus 48, upwardly and downwardly (arrow A in FIG. 1) as required or desired for performing a cotton distributing and/or compacting operation, and as guided by the external vertical pipes.

Figure 6:
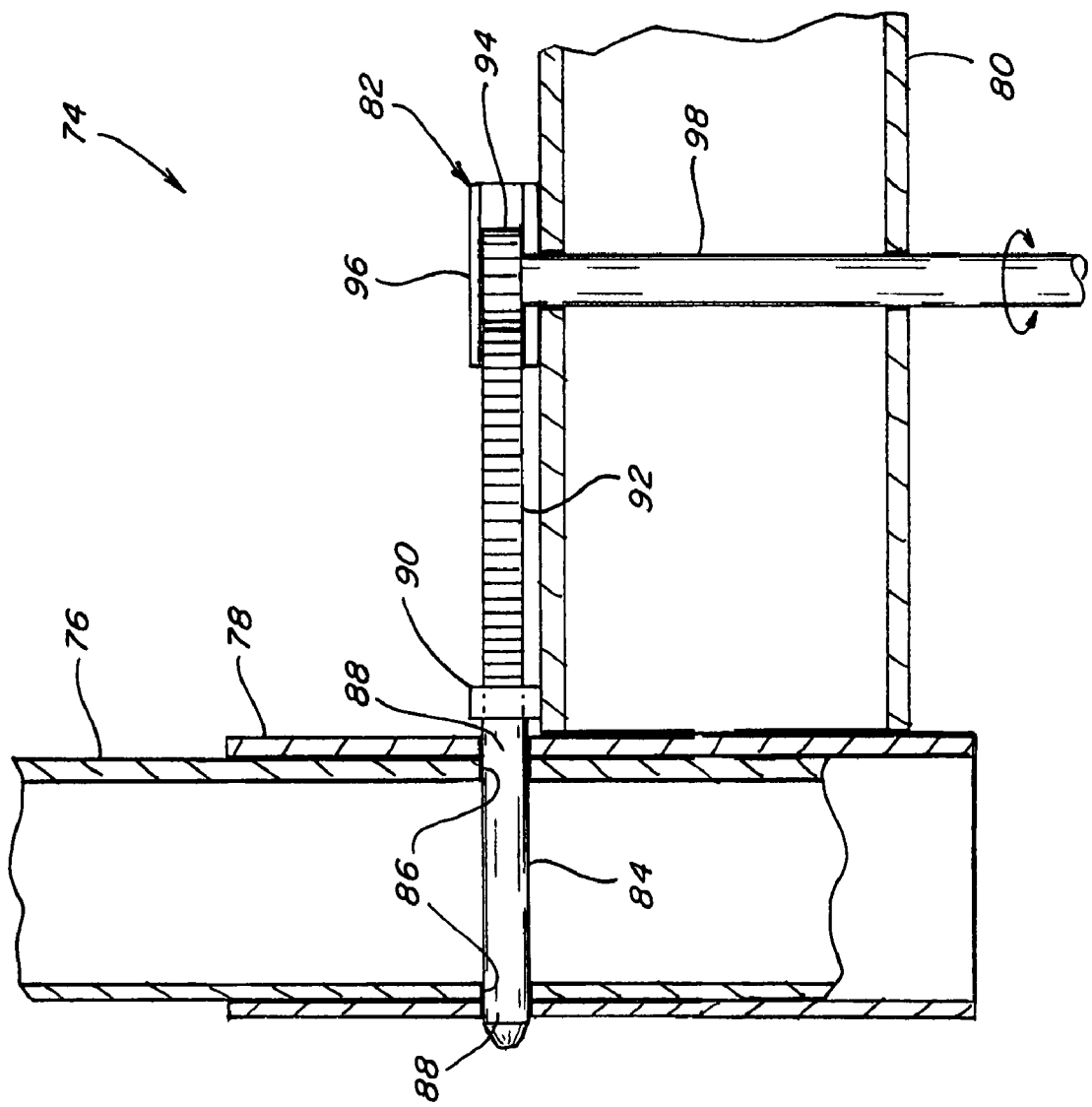
FIG. 6 is a sectional view showing aspects of the apparatus of FIG. 5, for locking the receiver in the operational position.
Figure 7:
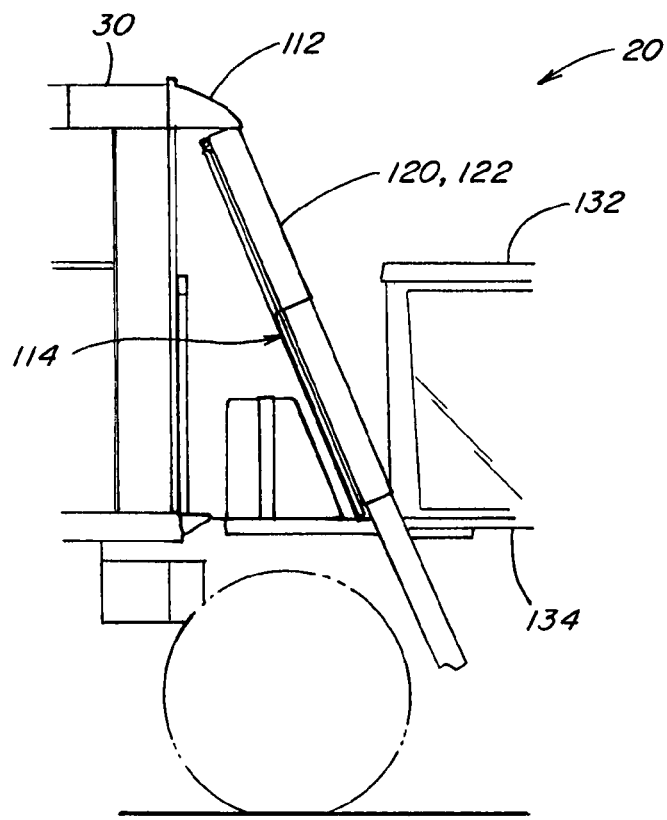
FIG. 7 is a simplified fragmentary side view of a harvester including apparatus of the invention in association with an alternative duct construction shown in an operational position in association with a receiver having an alternative hood construction.

Referring also to FIG. 6, each collapsible side support frame 74 preferably includes a pair of upstanding support members 76 connected to and supporting side beam 72, each support member 76 being supported for vertical movement within a sleeve 78, which, in turn, is fixedly supported by an A-shaped fixed frame 80 mounted in connection with floor 34. Each frame 80 includes a locking mechanism 82 of the invention, lockable for fixedly holding support member 76 in a predetermined raised operating position within sleeve 78, as shown in FIGS. 1, 3 and 5. This, in turn, holds upper receiver portion 42 in its operational position. Locking mechanisms 82 are unlockable, to allow lowering support members 76 to a lower, transport position, as shown in FIGS. 2 and 4, which moves upper receiver portion to its transport position. The external vertical pipes are connected to upper receiver portion 42, and move downwardly therewith.

Each locking mechanism 82 includes a locking element 84, which is preferably a pin, supported for horizontal movement between a locking position (FIG. 6) extending through holes 86 and 88 through support member 76 and sleeve 78, respectively, which are aligned when support members 76 are in the operational position, and an unlocking position, withdrawn from holes 86. Each locking element 84 is supported for this movement by a slide bracket 90, and mechanism 82 includes apparatus operable for remotely moving or sliding locking element 84 between its locking and unlocking positions, including a rack gear 92 enmeshed with a pinion gear 94. Rack gear 92 is supported by a slide bracket 96, enmeshed with gear 94, for horizontal sliding movement with locking element 84. Pinion gear is connected to an actuator rod 98 for rotation therewith about a longitudinal axis therethrough, rod 98 extending downwardly through a hollow vertical support member 100 to a location in the vicinity of, and preferably below floor 34 of receiver 30. This allows unlocking and locking mechanism from a lower, remote location, closer to ground level. For instance, the lower end of actuator rod 98 can be turned with a wrench for manually unlocking and locking the mechanism. Or, a powered actuator 102, which can be, for instance, a rotary fluid or electric actuator powered by a system on the harvester can be provided for automatic operation, for instance, as controlled by an operator using a switch located in an operator cabin of the harvester or elsewhere on the harvester, or as controlled by a controller as part of a routine for preparing the harvester for operation, or transport or storage. Actuator 102 can be connected directly to mechanism 82, or using rod 98. Thus, locking mechanisms 82 on the opposite sides of receiver 30 can be operated individually, sequentially, or simultaneously.

When upper locking mechanisms 82 are locked and holding support members 76, side support frames 74 will hold upper receiver portion 42 in the raised, operational position, and this structure is sufficiently robust to resist damage or significant deformation under forces exerted thereagainst by operation of compactor drivers 70. When it is desired to unlock locking mechanisms 82, compactor drivers 70 will be extended to lower compactor frame 52 of compactor apparatus 48, such that upper receiver portion 42 can be supported in another manner thereby, for instance, with the compactor frame supported on floor 34 of receiver 30, or on cotton accumulated therein, to remove loads on locking elements 84 sufficiently to enable movement thereof to the unlocking position. With locking elements 84 in the unlocking position, compactor drivers 70 can be retracted, which will lower upper receiver portion 42 to its transport position. When it is desired to move upper receiver portion 42 to its operational position, drivers 70 are extended. Locking mechanisms 82 can then be locked.

With upper receiver portion 42 in its raised, operational position, ducts 26 are configured to extend upwardly from row units 22 to inlet opening 46 of receiver 30, at an inclined angle. Here, the inclined angle is preferably about 60 to about 90 degrees relative to a horizontal reference such as floor 34, and more preferably about 75 degrees, although it should be recognized that this angle may vary for different applications. When upper receiver portion 42 is collapsed or lowered to its transportation or storage position, it will also be desirable to collapse or lower the upper portions of ducts 26 to a comparable reduced height, also for transport or storage purposes. This is preferably achieved in the present embodiment by utilizing a telescoping structure also, wherein each duct 26 includes an upper duct portion 104 telescopically movable or collapsible relative to a lower duct portion 106. More preferably, lower duct portion 106 is telescopically receivable within upper duct portion 104 as the upper duct portion is moved downwardly, although it is contemplated that other alternative constructions could also be used. Also preferably, upper duct portion 104 is maintained at the inclined angle during the telescoping movement for both telescopically extending and retracting the upper duct portion. This provides several advantages. One advantage is that the forces exerted against the duct portions 104 and 106, and any seals that may be present therebetween, during the telescoping movement are substantially longitudinal to the duct portions, so as to not exert undesirable side and/or bending loads thereagainst, or cause undue wear. As another advantage, the longitudinal movement will be smoother, and less subject to binding and drag. As still another advantage, upper end portions of the upper duct portions 104 are moved forwardly away from the front end of receiver 30 as the duct is collapsed, to provide clearance therebetween.

In this latter regard, in the embodiment of FIGS. 1 and 2, each upper duct portion 104 includes an upper end portion 108 configured for cooperatively conveying a flow of air and cotton into a corresponding inlet opening 46 of receiver 30, here upper end portions 108 of ducts 26 being configured as curved duct sections having a generally horizontal outlet opening 110 which is proximal to and faces the corresponding inlet opening 46 of receiver 30 when both the duct and the receiver are telescopically extended in their operational positions. Here also, upper duct portion 106 and upper end portion 108 thereof are of unitary construction, so as to retain the curved shape even when telescopically retracted. As upper duct portions 104 are collapsed along the overall inclined angle of the ducts, the simultaneous forward movement will result in movement of upper end portions 108 forwardly, away from receiver 30, to provide clearance for collapsing of that structure, including a hood or hoods 112 located over a space forwardly adjacent to or including inlet opening 46.

To facilitate automatic movement of ducts 26 between their telescopically extended operational positions and their retracted transport positions, and to retain upper duct portion 104 at the inclined angle sufficiently so as to provide the above discussed advantages, including to avoid binding and other problems, harvester 20 includes duct support structure 114 constructed and operable according to the teachings of the present invention. Duct support structure 114 essentially comprises at least one duct driver 116, which is preferably a fluid cylinder, connected between a frame 118 of harvester 20, and upper end portion 108 of upper duct portion 104, driver 116 being controllably operable for telescopically extending and retracting upper duct portion 104 between its operational and transport positions, at about the inclined angle. Driver or drivers 116 configured as a fluid cylinder can be suitably supplied with pressurized fluid available on harvester 20, in the well known manner, and can be actuated using an operator control, for instance, located in the operator cabin, or at another location, or can be actuated automatically using a suitable controller, for instance, as part of a routine for collapsing receiver 30 for transport.

Here, it should be recognized and understood that different harvesters may include varying numbers of row units, as represented by row unit 22, as well as varying numbers of ducts, represented by ducts 26, extending between the row units and the receiver of the harvester, as represented by receiver 30. For instance, a cotton harvester such as harvester 20 will typically include 4 to 6 row units, which may be configured for picking cotton plants from one or two sides. As a result, as few as 4, and as many as 12 ducts 26 may be utilized, it also being possible for some ducts to service more than one row unit. Thus, although all of the ducts will be generally oriented at about the inclined angle when viewed from the side, when viewed from the front, some or all of the ducts may be inclined to the right or left, as required for extending from the associated row units 22 to the inlet opening or openings 46. Also, it is contemplated that various of the ducts of a harvester may be of different sizes and/or shapes. Additionally, it is contemplated that one or more drivers 116 may be utilized for effecting the upward and downward movement of the upper duct portions 104 of the ducts 26. To accommodate this, it is contemplated that the connection or connections between the upper ends of driver or drivers 116 and upper duct portions 104 of ducts 26 can be configured to allow limited freedom of at least lateral or sideward relative movement therebetween during the upward and downward movements, while maintaining the ducts at about the inclined angle, which sideward movements can include rotating or angular movements, as desired or required to allow aligned relative telescoping movements of the duct portions, and to prevent binding, drag and resultant wear or other problems.

Figure 8:
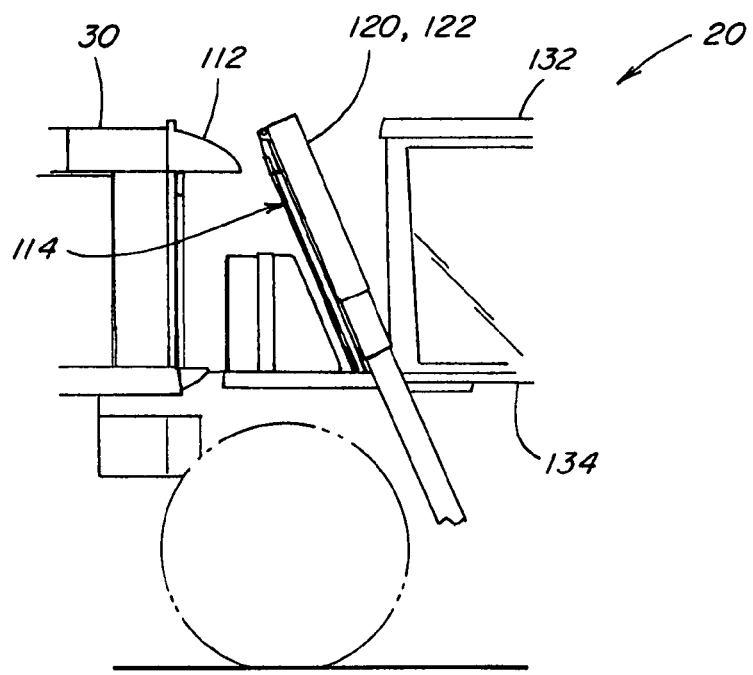
FIG. 8 is another simplified fragmentary side view of the ducts and receiver of FIG. 7, in a lowered collapsed position as effected by the apparatus of the invention.
Figure 9:
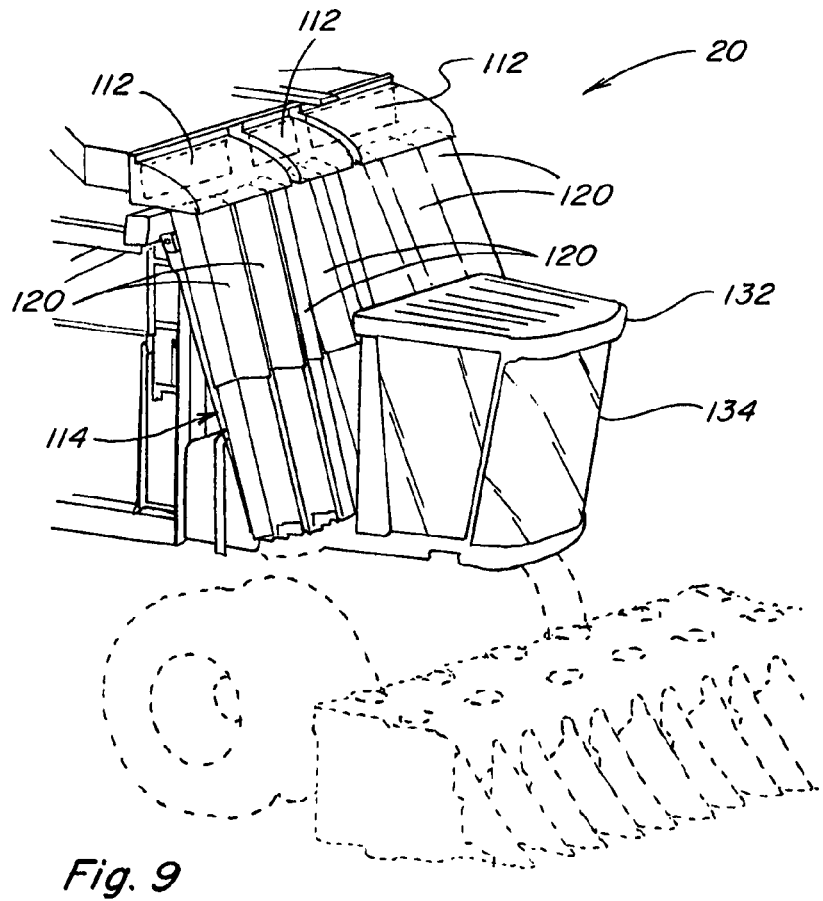
FIG. 9 is a simplified fragmentary perspective view of the ducts, receiver and apparatus of the invention of FIG. 7.
Figure 10:
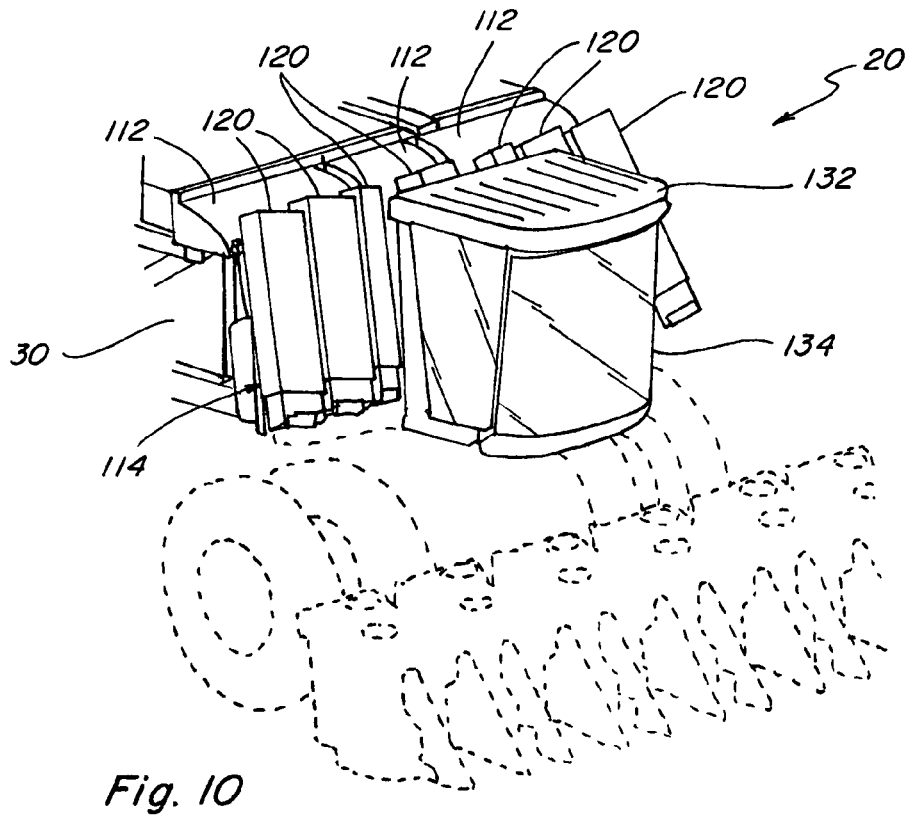
FIG. 10 is a simplified fragmentary perspective view of the ducts and receiver of FIG. 8.
Figure 11:
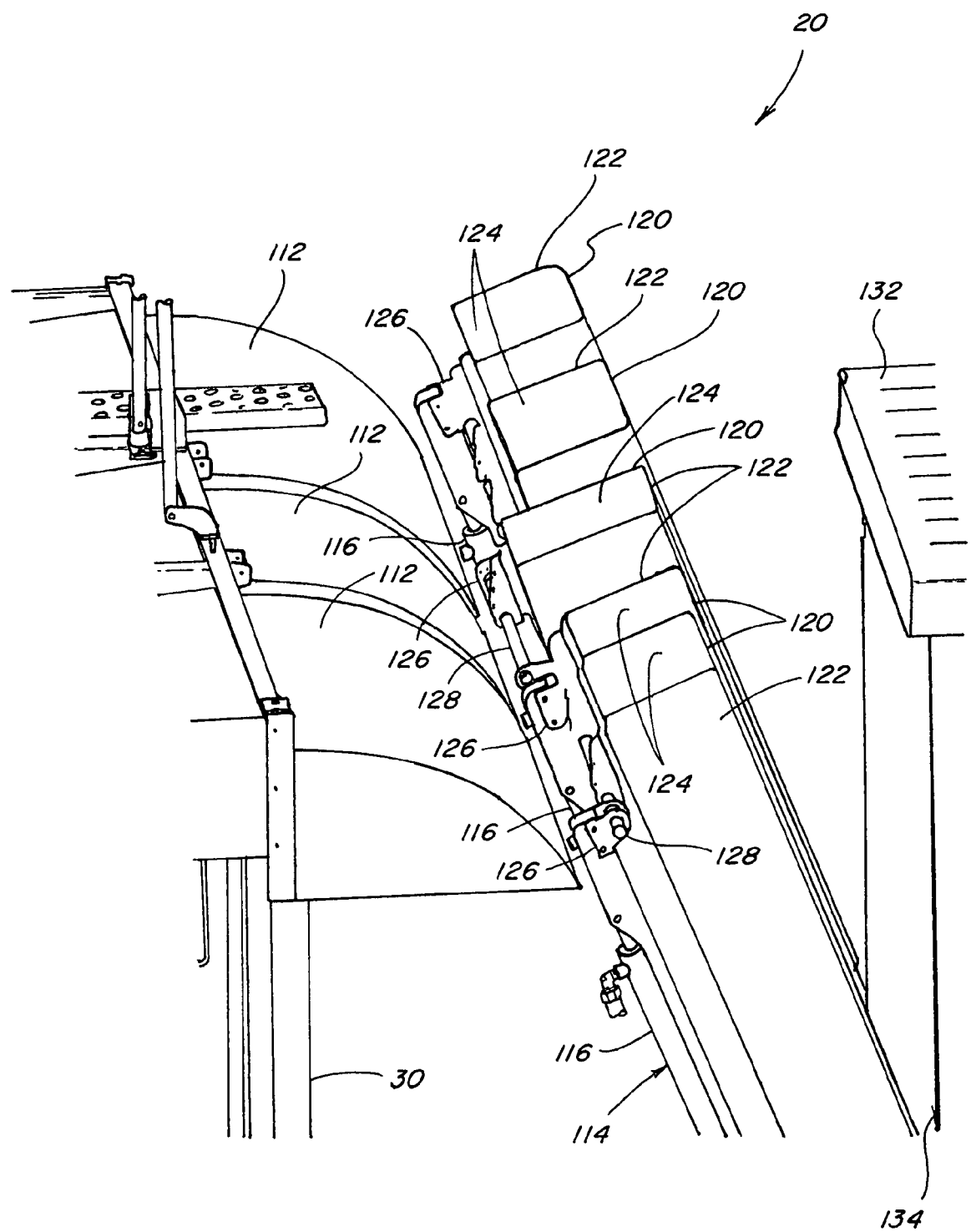
FIG. 11 is still another simplified fragmentary view of the ducts and receiver of FIG. 8.
Figure 12:
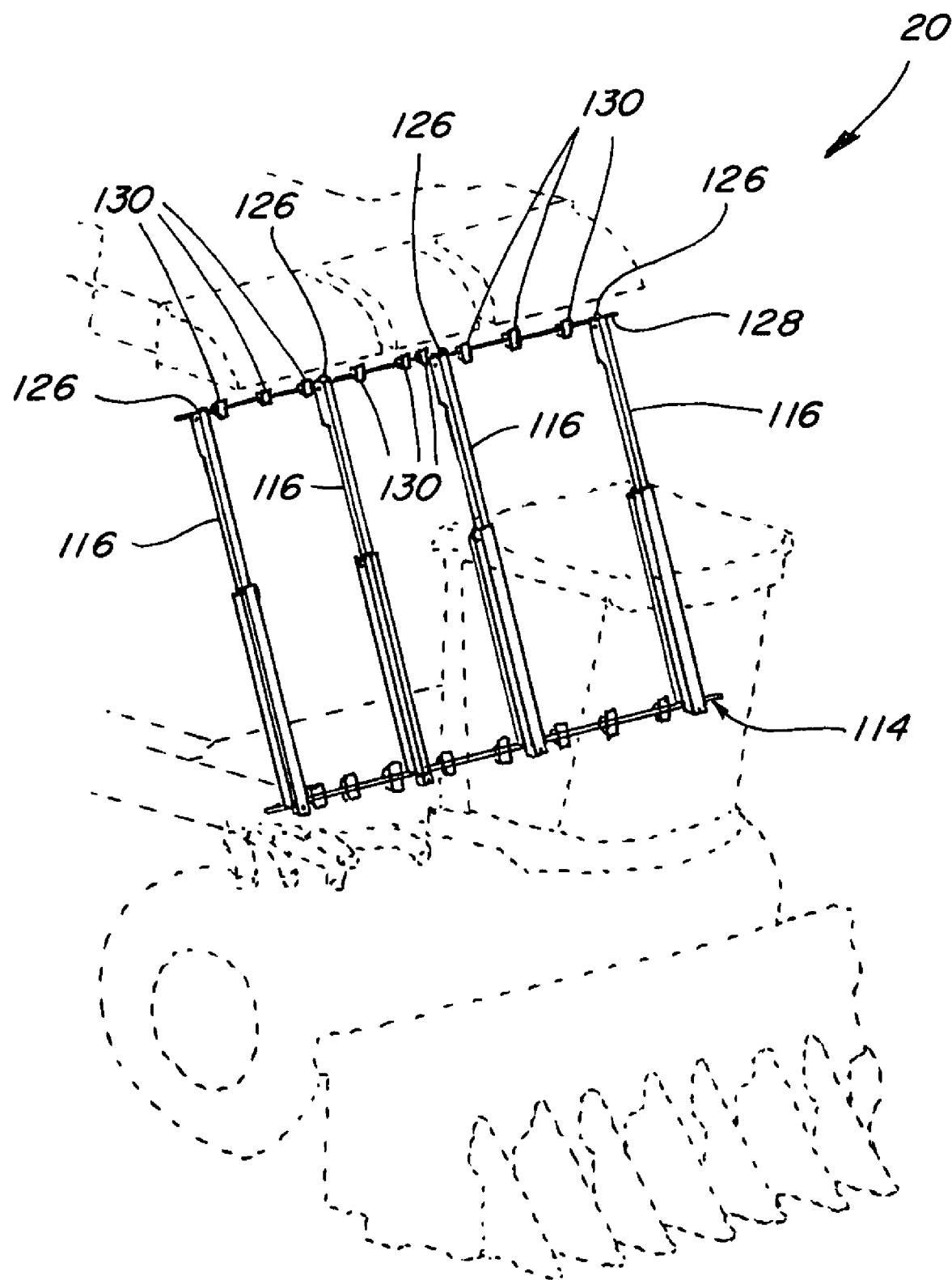
FIG. 12 is a simplified perspective view of duct support structure according to the invention in association with the harvester illustrated in dotted lines.
Figure 13:
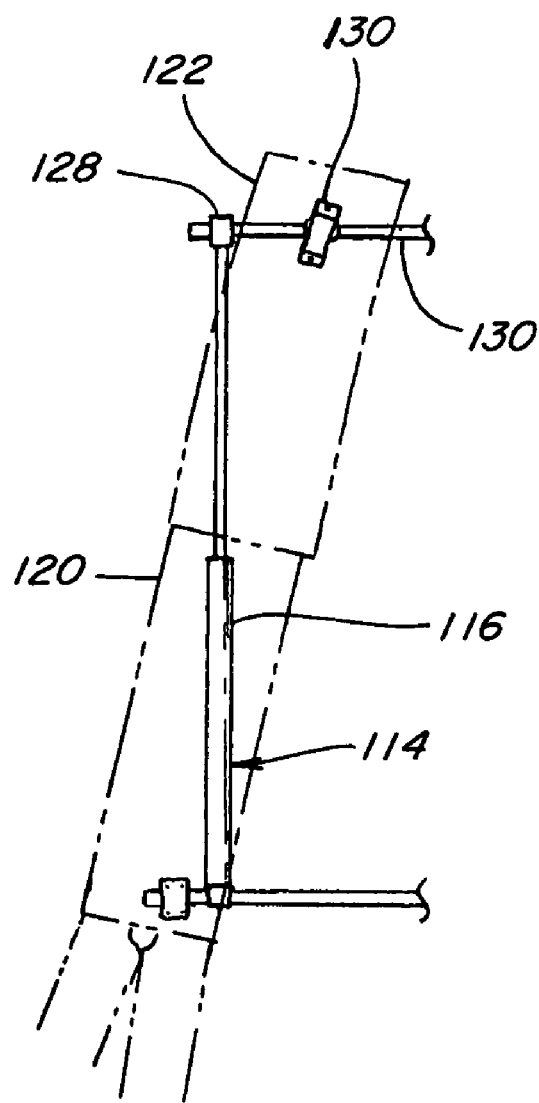
FIG. 13 is a simplified fragmentary end view of duct support structure of the invention, in a telescopically extended position, and showing an associated duct in dotted lines.
Figure 14:
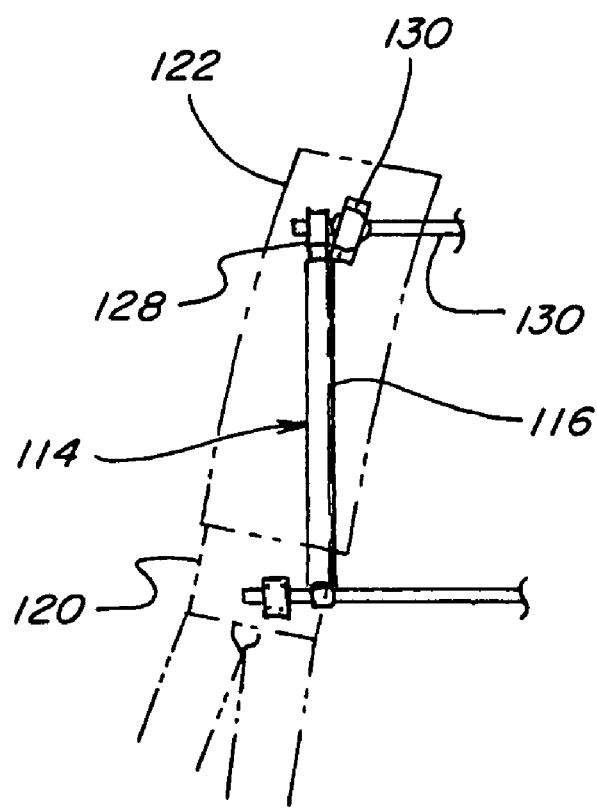
FIG. 14 is another simplified fragmentary end view of the duct support structure of the invention, in a telescopically retracted position, and showing the associated duct in dotted lines.

Referring also to FIGS. 7, 8, 9, 10, 11, 12, 13 and 14, harvester 20 is shown including a plurality of alternative ducts 120, at least some of which being oriented at a sideward angle in addition to the inclined angle, and some being of different sizes and shapes, as just discussed, like parts of ducts 120 and ducts 26 being identified by like numerals. The main difference between ducts 120 and 26 for the purposes of the invention is that ducts 120 include upper duct portions 122 which are straight and terminate at upwardly facing outlet openings 124 (FIG. 11), instead of curved upper end portions 108. Another difference is that the ducts are oriented at an inclined angle of about 65 degrees such that when telescopically extended in their operational positions, outlet openings 124 are disposed beneath one or more hoods 112. Duct support structure 114 of the invention is provided in connection with ducts 120, and is operable for telescopically moving them between their operational positions (FIGS. 7 and 9) and transport positions (FIGS. 8, 10 and 11). Here, duct support structure 114 comprises a plurality of sidewardly spaced apart duct drivers 116, each driver including an upper end portion connected by a bracket 126 to a sidewardly extending rod 128, which, in turn, supports at least one bracket 130 mounted to and supporting an upper duct portion 122 of a duct 120. In a preferred embodiment, each bracket 130 is configured to be slidable longitudinally along the associated rod 128, to allow the upper duct portion 122 to move sidewardly along rod 128 as the upper duct portion is moved upwardly and downwardly while being held at about the inclined angle by the associated driver. In this regard, one or more of brackets 130 can also have a pivoting capability, for instance, constructed as a ball joint, to allow sufficient freedom of sideward angular movement between the rod and the associated upper duct portion during the up and down movements to prevent exertion of possibly damaging or wearing loads on the ducts, and seals that may be located at the junctures of the upper and lower portions thereof.

In FIGS. 8, 10 and 11, it is evident that when collapsed in the lowered transport position, upper duct portions 122 are sufficiently forward of hoods 112 to allow receiver 30 to be fully collapsed, both duct portions 122 and receiver 30 being lowered to about the level of a roof 132 of operator cabin 134 of the harvester.

Figure 15:
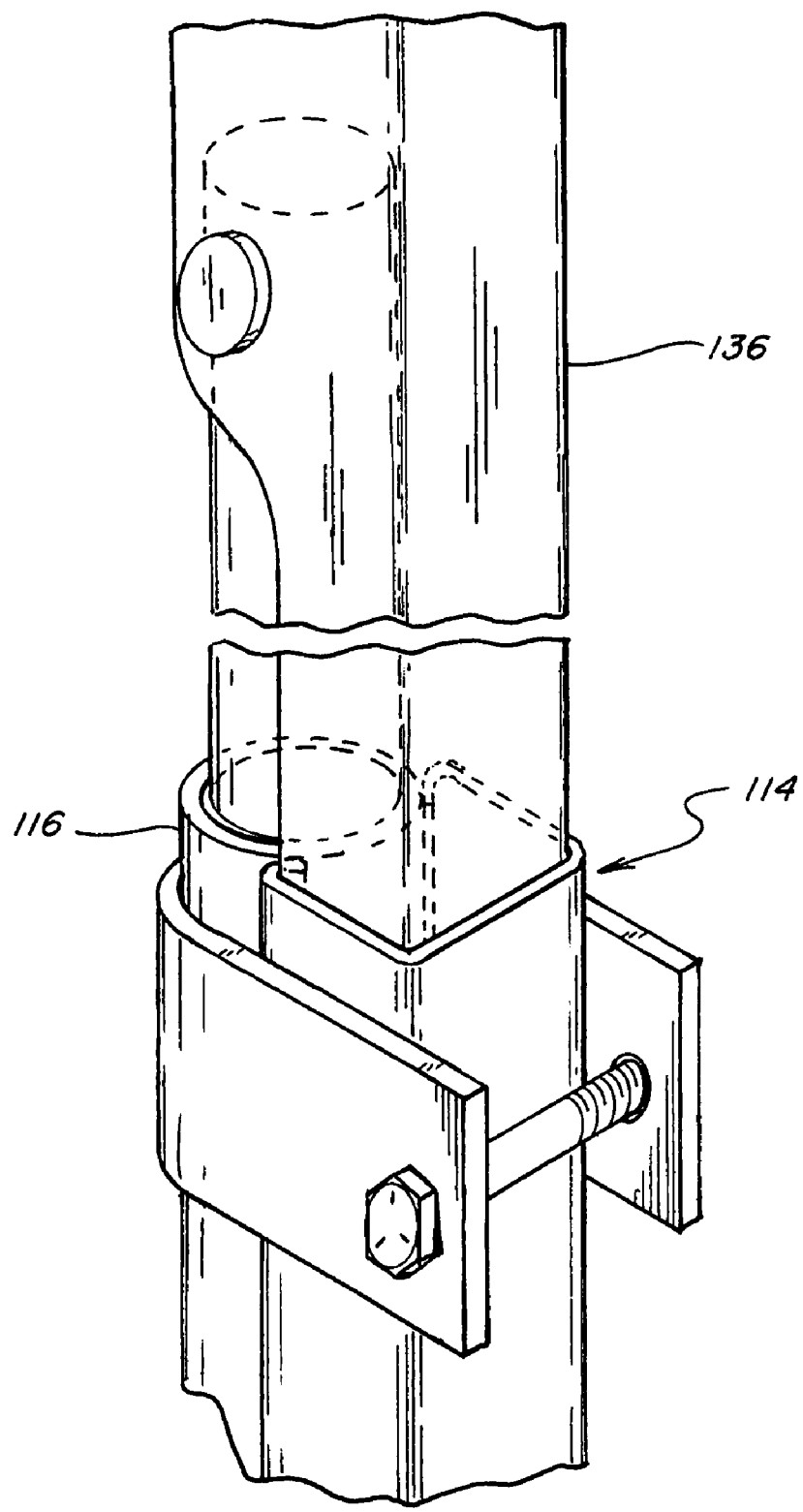
FIG. 15 is a fragmentary perspective view of a duct driver of the duct support structure of the invention, illustrating an associated telescoping stiffening brace.

Referring also to FIG. 15, a duct driver 116 of duct support structure 114 is illustrated attached to a parallel telescoping stiffening brace 136, which provides added strength against lateral loads. This structure, as well as the elements 126, 128 and 130 can be utilized with any duct construction, including ducts 26, with equal utility.

Figure 16:
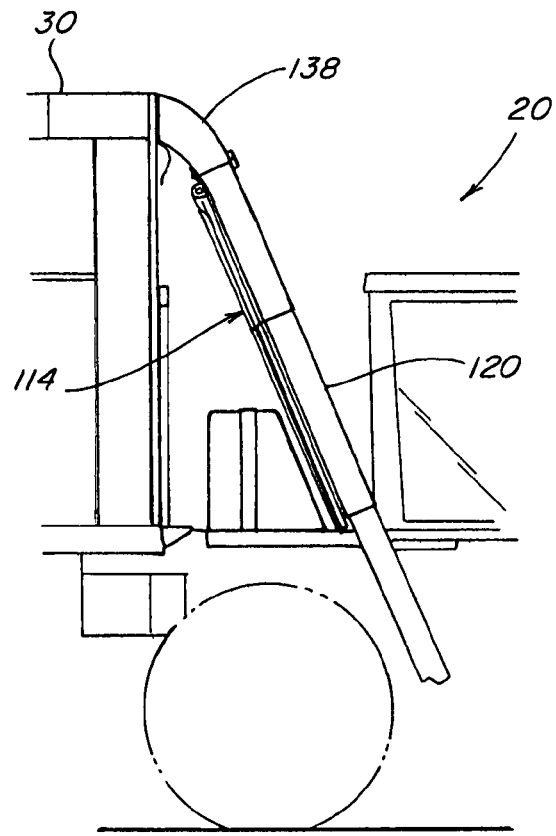
FIG. 16 is another simplified fragmentary side view of the harvester, showing still another alternative duct structure and the apparatus of the invention.
Figure 17:
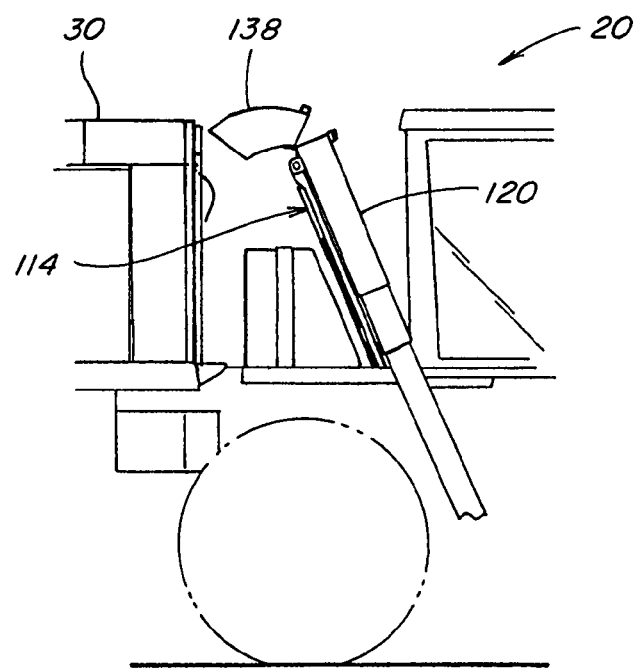
FIG. 17 is another simplified fragmentary side view of the harvester of FIG. 16, showing the duct structure in a collapsed position as effected by the apparatus of the invention.

Still further, as illustrated in FIGS. 16 and 17, harvester 20 is illustrated including duct support structure 114 of the invention in association with a telescoping duct 120 having a pivotally mounted, curved upper end portion 138, to illustrate the utility of the invention with a variety of alternative duct structures. Here, duct 120 is illustrated in the operational and transport positions, respectively, as is cotton receiver 30.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A harvester comprising:
a frame;
at least one row unit supported by the frame and operable for removing crop from plants;
a crop receiver supported by the frame and including an interior for receiving crop removed from plants by the at least one row unit; the crop receiver having an upwardly open lower receiver portion supported by the frame and an upper receiver portion telescopically supported on and movable relative to the lower receiver portion between a transport position telescopically retracted into the lower receiver portion and an operational position telescopically projecting upwardly therefrom, the upper receiver portion including at least one inlet opening configured for receiving crop into the interior therethrough;
an air duct system including at least one telescoping duct configured for carrying a flow of air and crop, the duct being capable of telescopically extending at an inclined angle from the at least one row unit to adjacent to the at least one inlet opening of the upper receiver portion when in the operational position, the duct including an upper duct portion telescopically movable relative to a lower duct portion between an extended position wherein a substantial portion of the upper duct portion extends telescopically from the lower duct portion and wherein an upper end portion extends from the upper duct portion, the upper end portion having a curved shape, wherein the upper end portion is positioned adjacent to the inlet opening for directing the flow of air and crop thereto when the upper receiver portion is in the operational position, and a retracted position wherein a substantial portion of the upper duct portion is at least substantially coextensive with the lower duct portion, wherein the upper duct portion and upper end portion are unitary so as to retain the curved shape when the upper duct is retracted; and
a duct support system including at least one duct driver supported by the frame, the duct drive extending at about the inclined angle at least generally parallel to the duct, the duct driver having an upper movable portion also extending at about the inclined angle, the upper movable portion is connected to the upper duct portion, the duct driver being operable for moving the upper duct portion along the inclined angle between the extended position and the retracted position, and wherein as the upper duct portion is moved toward the retracted position the upper end portion thereof will be displaced horizontally away from the receiver.

2. The harvester of claim 1, wherein the receiver includes a hood projecting outwardly therefrom above the inlet opening such that when the upper receiver portion is in the operational position the hood will be disposed over the upper end portion of the upper duct portion, and when the upper receiver portion is in the transport position and the upper duct portion is in the retracted position, the upper end portion of the duct will be located horizontally adjacent to and outside of the hood.

3. The harvester of claim 2, wherein the receiver includes a plurality of the inlet openings extending in side by side relation between opposite side walls thereof and adjacent to a roof structure of the upper receiver portion covering the interior, and wherein the harvester includes a plurality of the hoods above the inlet openings, respectively.

4. The harvester of claim 3, wherein at least some of the hoods are spaced apart and are separated by divider walls.

5. The harvester of claim 1, wherein the receiver includes at least one locking mechanism operable for locking the lower receiver portion to the upper receiver portion when in the operational position thereof.

6. The harvester of claim 5, wherein the locking mechanism is configured to be lockable and unlockable from a remote location.

7. The harvester of claim 5, wherein the locking mechanism comprises at least one locking element supported so as to be movable between a locking position extending between structural elements of the lower receiver portion and the upper receiver portion when in the operational position, and an unlocking position withdrawn from at least one of the structural elements.

8. The harvester of claim 5, wherein the locking mechanism includes an actuator operable for automatically locking and unlocking the mechanism.

9. The harvester of claim 5, wherein the receiver includes compactor apparatus within the interior thereof and at least one compactor driver controllably operable for driving the compactor apparatus downwardly through a range of compacting positions for compacting any crop contained within the interior, the locking mechanism being configured such that when locked with the upper receiver portion in the operational position and the compactor apparatus in a lower one of the compacting positions, the locking mechanism can be unlocked and the compactor driver operated to lower the upper receiver portion to the transport position.

10. The harvester of claim 9, wherein the compactor driver is operable with the upper receiver portion in the transport position, to raise the upper receiver portion to the operational position.

11. The harvester of claim 9, wherein the at least one compactor driver comprises fluid cylinders disposed adjacent to opposite sides of the receiver, respectively.

12. The harvester of claim 1, wherein the row unit comprises apparatus operable for removing cotton from cotton plants.

13. A harvester comprising:
a horizontally extending frame;
at least one row unit supported by the frame for removing crop from plants;
a crop receiver supported by the frame and including an interior for receiving crop removed from plants by the at least one row unit, the crop receiver having an upwardly open lower receiver portion supported by the frame and art upper receiver portion enclosing the upwardly open lower receiver portion and telescopically movable relative thereto between a transport position telescopically retracted therein and an operational position telescopically projecting upwardly therefrom, the upper receiver portion including a forward wall having an upper end including at least one inlet opening configured for receiving crop into the interior therethrough, and a hood extending forwardly from the forward wall over a space forwardly of the inlet opening;
an air duct system including at least one telescoping duct configured for carrying a flow of air and crop, the duct when in a telescopically extended position being capable of extending in at least one of an inclined angle and a sideward angle from the at least one row unit to the space forwardly of the at least one inlet opening and beneath the hood when the upper receiver portion is in the operational position, and the duct when in a telescopically retracted position being disposed such that when the upper receiver portion is in the transport position substantially all of the duct will be located forwardly of the hood; and a duct support system including at least one duct driver supported by the frame at about the inclined angle and generally parallel to the duct, the duct driver having an upper movable portion coupled to a substantially extending rod, the rod coupled to a telescopically movable upper portion of the duct by a bracket and operable for telescopically moving the upper portion of the duct along the inclined angle between the telescopically extended position and the telescopically retracted position, wherein the bracket is slidable longitudinally along the rod allowing the upper duct portion to move sidewardly along the rod as the upper duct portion is moved upwardly and downwardly while being held at about the inclined angle by the driver, further wherein the bracket is pivotal to allow sideward angular movement between the rod and the upper duct portion during the up and down movement of the upper duct portion.

14. The harvester of claim 13, wherein the upper receiver portion includes a plurality of the inlet openings extending in side by side relation across the forward wall between opposite side walls of the upper receiver portion and adjacent to a roof structure thereof covering the interior, and wherein the harvester includes a plurality of the hoods disposed above the spaces forwardly of the inlet openings, respectively.

15. The harvester of claim 13, wherein the receiver includes at least one locking mechanism operable for locking the receiver portions together with the upper receiver portion in the operational position.

16. The harvester of claim 15, wherein the locking mechanism is configured to be lockable and unlockable from a remote location.

17. The harvester of claim 15, wherein the locking mechanism comprises at least one locking element supported so as to be movable between a locking position extending between structural elements of the upper receiver portion when in the operational position and the lower receiver portion for locking the receiver portions together, and an unlocking position withdrawn from at least one of the structural elements for unlocking the receiver portions.

18. The harvester of claim 15, wherein the locking mechanism includes an actuator operable for automatically locking and unlocking the mechanism.

19. The harvester of claim 15, wherein the receiver includes compactor apparatus within the interior thereof and at least one compactor driver controllably operable for driving the compactor apparatus downwardly through a range of compacting positions, the locking mechanism being configured such that when locking the receiver portions together and with the compactor apparatus in a lower one of the compacting positions, the locking mechanism can be operated to unlock the receiver portions, and the compactor driver operated to lower the upper receiver portion to the transport position.

20. The harvester of claim 13, wherein the row unit comprises apparatus operable for removing cotton from cotton plants.

* * * * *